(12) United States Patent
Koyama

(10) Patent No.: US 7,737,402 B2
(45) Date of Patent: Jun. 15, 2010

(54) DISTANCE ADJUSTING APPARATUS AND METHOD, AND OBJECT EXAMINING APPARATUS AND METHOD

(75) Inventor: Yasushi Koyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/201,745

(22) Filed: Aug. 29, 2008

(65) Prior Publication Data

US 2009/0057559 A1    Mar. 5, 2009

(30) Foreign Application Priority Data

Aug. 31, 2007  (JP) ............... 2007-224942
Jun. 25, 2008  (JP) ............... 2008-165175

(51) Int. Cl.
G01N 21/17 (2006.01)
(52) U.S. Cl. ............................................. 250/341.1
(58) Field of Classification Search ............... 250/341.1
See application file for complete search history.

(56) References Cited

U.S. PATENT DOCUMENTS

| 5,623,145 A | 4/1997 | Nuss ............... 250/330 |
| 2006/0085160 A1* | 4/2006 | Ouchi ............. 702/150 |
| 2006/0227340 A1* | 10/2006 | Shioda et al. ....... 356/614 |
| 2008/0238571 A1* | 10/2008 | Kurosaka ........... 333/116 |

FOREIGN PATENT DOCUMENTS

| GB | 2452267 A | * | 3/2009 |
| JP | 8-320254 | | 12/1996 |

OTHER PUBLICATIONS

Ohkubo et al., "Micro-strip-line-based Sensing Chips for Characterization of Polar Liquids in Terahertz Regime", Applied Physics Letters 88, 212511 (2006).

* cited by examiner

*Primary Examiner*—Constantine Hannaher
(74) *Attorney, Agent, or Firm*—Fitzpatrick, Cella, Harper & Scinto

(57) ABSTRACT

In apparatuses and methods for adjusting a distance to an object, or examining an object, by using terahertz radiation, a sensor portion and a distance changing portion are used. The sensor portion includes a generator for generating terahertz radiation, a transmission line for transmitting the terahertz radiation, and a detector for detecting the terahertz radiation transmitted through the transmission line. The distance changing portion is configured to change the distance between the object and the sensor portion. The distance is adjusted based on information of the terahertz radiation detected by the detector. The object is examined based on the information of the terahertz radiation detected by the detector, after the distance is adjusted based on the information of the terahertz radiation detected by the detector. Under a condition of the adjusted distance, leaking electromagnetic field of the terahertz radiation transmitted through the transmission line interacts with the object.

17 Claims, 10 Drawing Sheets

LINE WIDTH 2 μm

LINE WIDTH 10 μm

DISTANCE ADJUSTING APPARATUS AND METHOD, AND OBJECT EXAMINING APPARATUS AND METHOD

BACKGROUND OF THE INVENTION

1. Field of the Invention

The present invention relates to a distance adjusting apparatus and method for adjusting a distance between a sensor portion and an object to be examined, and an object examining apparatus and method for examining an object using the distance adjusting apparatus and method. Particularly, the present invention relates to a distance adjusting apparatus and method, and an object examining apparatus and method, using terahertz (THz) electromagnetic radiation.

2. Description of the Related Background Art

In this specification, the terminology "terahertz (THz) radiation", or the like is used for electromagnetic radiation in a frequency range between about 30 GHz and about 30 THz. In recent years, non-destructive sensing technology using terahertz radiation has been developed and searched. Technical fields using such terahertz radiation include imaging fields using safe see-through examining apparatuses in place of X-ray apparatuses. Further, development has also been made with respect to spectroscopic technology for acquiring absorption spectra and complex dielectric constants to examine characteristics, such as bonding condition, of substances, analytic technology for analyzing bio-molecules, estimating technology for estimating carrier concentration and mobility, and the like.

An apparatus for examining an object using terahertz radiation is disclosed in JP 08-320254 A. In this apparatus, an object is irradiated with terahertz radiation transmitted in a space, and characteristics of materials in the object are examined based on changes in transmission condition of terahertz radiation transmitted through the object. According to this technology, a see-through image of an object can be obtained by scanning the object two-dimensionally.

It is well known that terahertz radiation can propagate through a transmission line used for transmission of high-frequency radiation signals. A paper published in the *Applied Physics Letters* ("APL"), 88, 212511, 2006, discloses an examining apparatus for examining characteristics of an object in an on-chip manner in which an object is placed on the transmission line, using the above-described property of terahertz radiation. The sensor chip described in that paper uses a generator for generating terahertz radiation, a microstrip line, and a detector for detecting terahertz radiation, integrated on a glass substrate. In the *APL* article, attenuation in intensity of terahertz radiation and delay of time-domain waveform of terahertz radiation due to interaction between leaking electromagnetic field and water placed on the microstrip line are measured. The leaking electromagnetic field is an electromagnetic field that appears due to slight leakage of terahertz radiation from the microstrip line.

The above-described terahertz radiation examining systems using the sensor chip have the following disadvantages due to the use of on-chip examination.

These systems are not suited for measuring a large amounts or quantities of the objects being studied at high rate. For example, where the purpose is screening various bio-molecules, chemical substances, or the like, sufficient examination speed and economical cost are required as well as sufficient examination accuracy. In the conventional system, however, a considerable number of steps of supplying a sample, placing a chip on the examining apparatus, removing the chip therefrom, and the like are necessary, so that speedy examination is difficult to attain.

In addition, where a large number of samples are examined, the number of chips to be used must correspond to the number of samples. However, considering that semiconductor crystal is generally used to generate and detect terahertz radiation, it is likely that the examination cost will increase to a problematic degree as the number of chips increases.

SUMMARY OF THE INVENTION

It is an object of the present invention to provide a distance adjusting apparatus and method for adjusting a distance between a sensor portion and an object, and an object examining apparatus and method for examining an object.

According to one aspect of the present invention, there is provided an apparatus for adjusting a distance to an object by using terahertz radiation, which includes a sensor portion provided with a generator for generating terahertz radiation, a transmission line for transmitting the terahertz radiation, a detector for detecting the terahertz radiation transmitted through the transmission line; a delay portion for changing time at which the detector detects the terahertz radiation; a processing portion for performing sampling of a signal detected by the detector and obtained by using the delay portion to obtain information of a time waveform of the terahertz radiation; and a distance changing portion for changing a distance between the object and the sensor portion, and in which the distance is adjusted by using the information of the time waveform.

According to another aspect of the present invention, there is provided a method for adjusting a distance to an object by using terahertz radiation, which includes a first step of generating terahertz radiation under a first condition in which a distance between an object and a transmission line for transmitting terahertz radiation is set at a first distance; a second step of detecting the terahertz radiation generated in the first step under the first condition; a third step of obtaining information of a time waveform of the terahertz radiation detected in the second step; a fourth step of moving the transmission line or the object to change the distance to a second distance shorter than the first distance; a fifth step of generating terahertz radiation under a second condition in which the distance is set at the second distance; a sixth step of detecting the terahertz radiation generated in the fifth step under the second condition; a seventh step of obtaining information of a time waveform of the terahertz radiation detected in the sixth step; an eighth step of comparing the information obtained in the third step to the information obtained in the seventh step; and a ninth step of judging presence or absence of interaction between the object and leaking electromagnetic field of the terahertz radiation transmitted through the transmission line, based on presence or absence of a change in a result of the comparison of the information performed in the eighth step.

According to another aspect of the present invention, there is provided an examination apparatus for obtaining information of an object, which includes a sensor portion; and a distance adjusting or changing portion, and in which information of an object is obtained based on a detection signal which is detected by a detector in the sensor portion, and reflects a condition of interaction between the object and terahertz radiation transmitted through a transmission line in the sensor portion. The sensor portion includes a generator for generating terahertz radiation, the transmission line, and the detector. The distance adjusting or changing portion adjusts a distance between the object and the transmission line, based on the detection signal detected by the detector for detecting the terahertz radiation generated by the generator and transmitted through the transmission line.

According to another aspect of the present invention, there is provided an examination method which includes a step of preparing a sensor including a generator for generating terahertz radiation, a transmission line, and a detector; an object placing step; a coarse moving step, a distance recognizing step; a distance setting step; and an information obtaining step. In the object placing step, the object is placed at a position facing the transmission line in the sensor. In the coarse moving step, a distance between the object and the transmission line is decreased while a detection signal of the detector for detecting the terahertz radiation generated by the generator and transmitted through the transmission line is monitored. In the distance recognizing step, a distance, at which interaction between a surface of the object and leaking electromagnetic field leaking from the transmission line begins, is recognized based on a change in the detection signal of the detector. In the distance setting step, after the recognition of the distance, the distance between the object and the transmission line is set at a target distance at which the object interacts with the leaking electromagnetic field. In the information obtaining step, under a condition in which the distance is set at the target distance, information of the object is obtained based on the detection signal which is detected by the detector, and reflects a condition of interaction between the object and the terahertz radiation transmitted through the transmission line.

According to another aspect of the present invention, there is provided an apparatus for adjusting a distance to an object by using terahertz radiation, which includes a sensor portion provided with a generator for generating terahertz radiation, a transmission line for transmitting the terahertz radiation, a detector for detecting the terahertz radiation transmitted through the transmission line; a distance adjusting or changing portion for changing a distance between the object and the sensor portion, and in which the distance is adjusted based on information of the terahertz radiation detected by the detector.

According to another aspect of the present invention, there is provided a method for adjusting a distance to an object by using terahertz radiation, which includes a first step of generating terahertz radiation under a first condition in which a distance between an object and a transmission line for transmitting terahertz radiation is set at a first distance; a second step of detecting the terahertz radiation generated in the first step under the first condition; a third step of obtaining information of the terahertz radiation detected in the second step; a fourth step of moving the transmission line or the object to change the distance to a second distance shorter than the first distance; a fifth step of generating terahertz radiation under a second condition in which the distance is set at the second distance; a sixth step of detecting the terahertz radiation generated in the fifth step under the second condition; a seventh step of obtaining information of the terahertz radiation detected in the sixth step; an eighth step of comparing the information obtained in the third step to the information obtained in the seventh step; and a ninth step of judging presence or absence of interaction between the object and leaking electromagnetic field of the terahertz radiation transmitted through the transmission line, based on presence or absence of a change in a result of the comparison of the information of the terahertz radiation performed in the eighth step.

According to apparatuses and methods of the present invention using the above-described distance changing or adjusting portion, the distance between the object and the transmission line can be decreased to such a target distance that the object can sufficiently interact with electromagnetic field leaking from the transmission line. For example, the transmission condition or property of the terahertz radiation can be examined at the target distance, and information of the object, such as characteristics thereof, can be obtained.

Further, according to apparatuses and methods of the present invention, it is possible to recognize the beginning of interaction between the surface of the object and the leaking electromagnetic field leaking from the transmission line, based on the change in the detection signal detected by the detector. Since the distance, at which the interaction begins, is approximately known beforehand, a relative distance between the object and the transmission line can be approximately recognized upon recognition of the beginning of the interaction. Furthermore, the distance between the object and the transmission line can be decreased to the target distance, at which the object can sufficiently interact with the leaking electromagnetic field, based on the change in the detection signal. Therefore, the transmission condition of the terahertz radiation can be examined at a sufficiently short distance, and the information of the object, such as characteristics thereof, can be accurately obtained. Here, once the relative distance between the object and the transmission line can be approximately recognized, the relative distance can be readily and accurately decreased to the target distance step by step by a controlled amount.

Further features of the present invention will become apparent from the following description of exemplary embodiments with reference to the attached drawings.

DESCRIPTION OF THE EXEMPLARY EMBODIMENTS

The preferred embodiments of the present invention will hereinafter be described with reference to the drawings.

Figure 9:
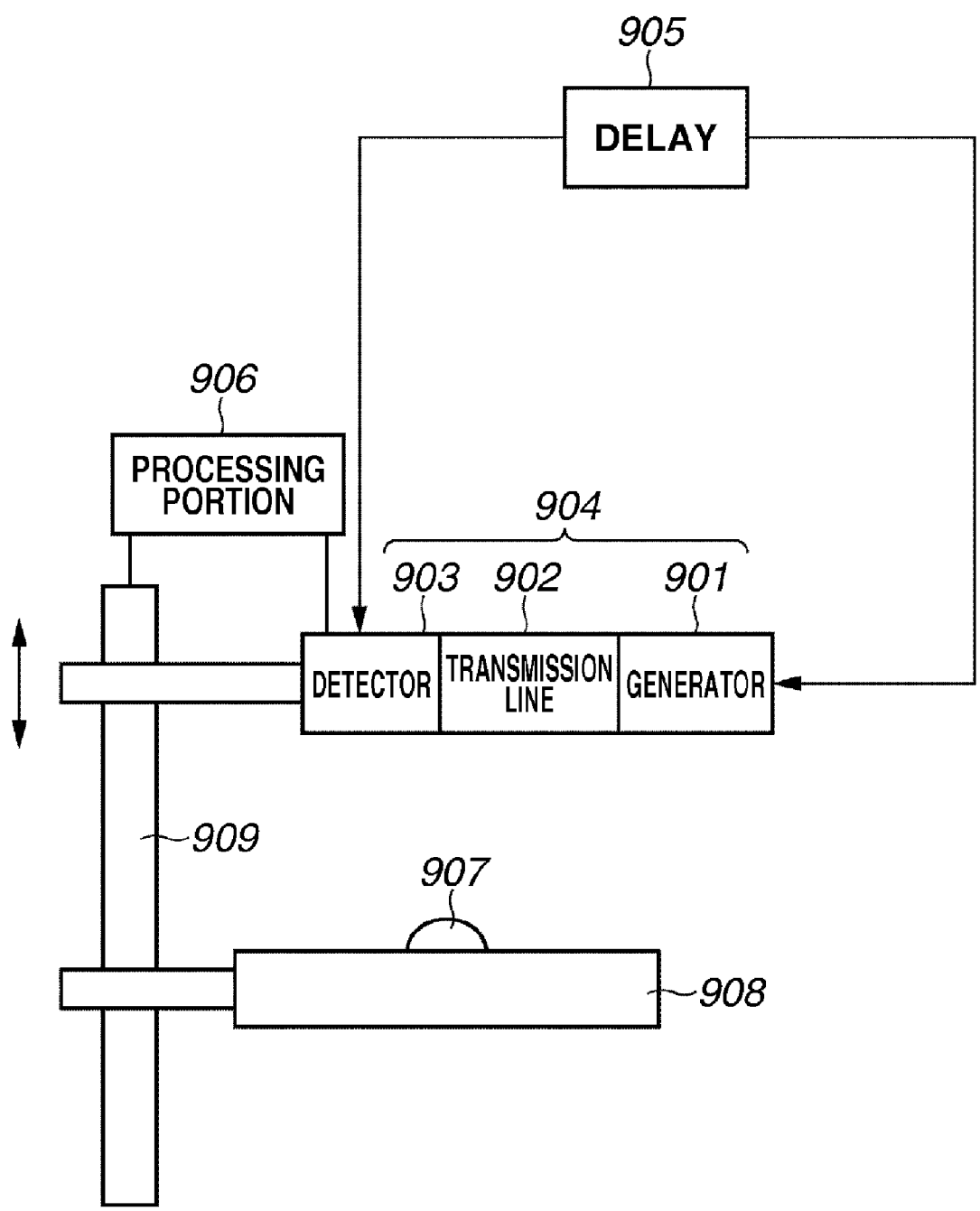
FIG. 9 is a schematic view illustrating another embodiment of apparatuses and methods according to the present invention.

FIG. 9 shows an embodiment of an apparatus for adjusting the distance by using terahertz radiation. In FIG. 9, reference numeral 901 designates a generator for generating terahertz radiation. The generator 901 is composed of, for example, a photoconductive layer of low-temperature grown gallium arsenide (LT-GaAs), indium gallium arsenide (InGaAs), or the like. The photoconductive layer is a layer that generates carriers when irradiated with light. As the generator 901, semiconductor devices with electromagnetic radiation gains, such as a resonance tunnel diode or a Gunn diode, can also be used.

Further, reference numeral 902 designates a transmission line for transmitting terahertz radiation produced by the generator 901. As the transmission line 902, a microstrip line of material with an electric conductivity, such as metal, can be used. Reference numeral 903 designates a detector for detecting terahertz radiation transmitted through the transmission line 902. In this embodiment, the above-described photoconductive layer is also used as the detector 903. As the detector 903, detection devices, such as a Schottky barrier diode, can also be used. Reference numeral 904 designates a sensor portion including the generator 901, the transmission line 902, and the detector 903.

Reference numeral 905 designates a delay portion for changing or delaying time at which the detector 903 detects terahertz radiation. The delay portion 905 can be comprised of a unit for changing an optical path of light applied to the generator 901 or the detector 903.

Figure 10:
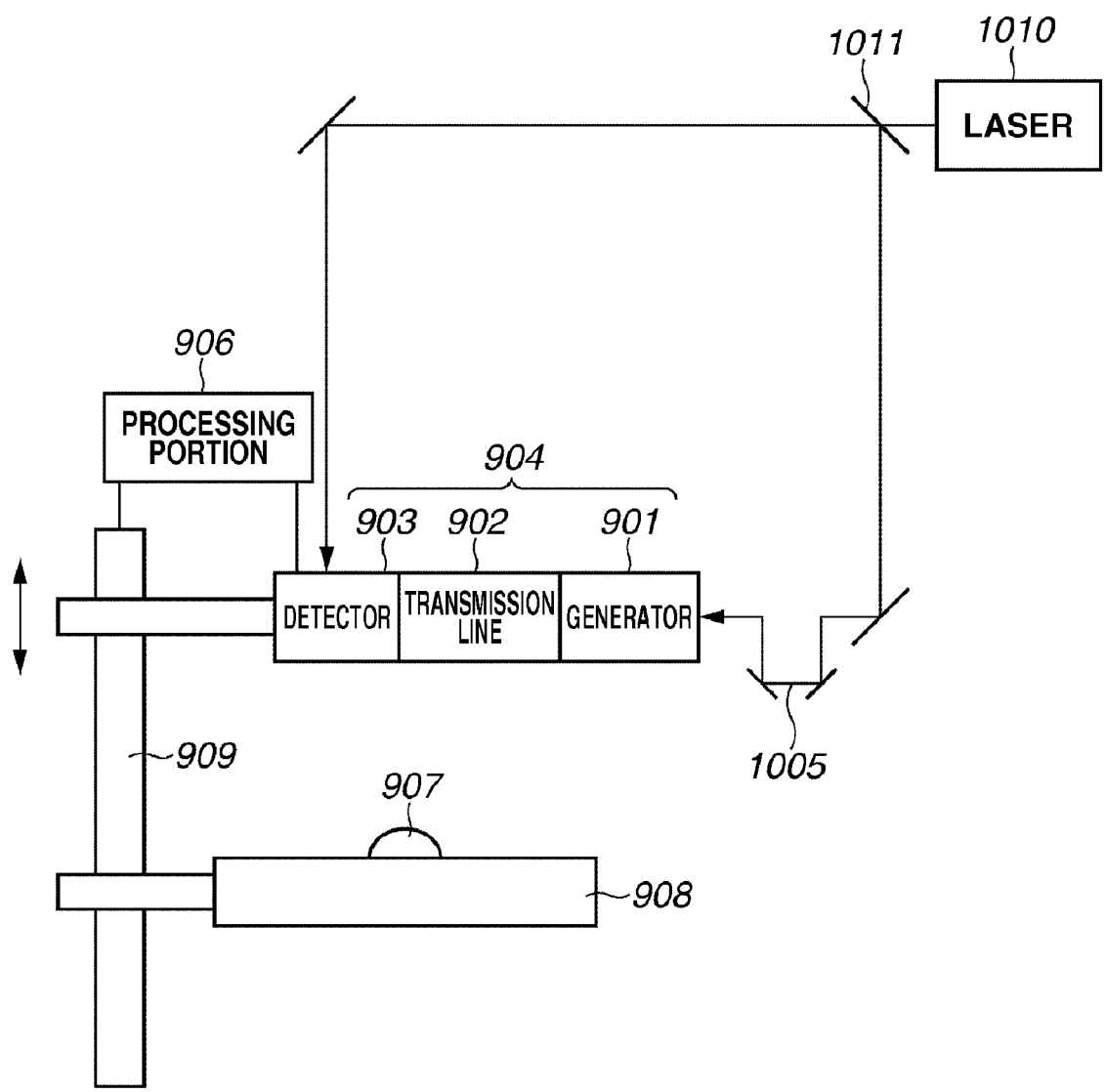
FIG. 10 is a schematic view illustrating an example of the embodiment of FIG. 9.

FIG. 10 illustrates an example of the delay portion 905 for optically performing time delaying, i.e., a time delay portion 1005. In FIG. 10, reference numeral 1010 designates a laser radiating portion for applying laser light to the generator 901 and the detector 903. Further, reference numeral 1011 designates a beam splitter for splitting the laser light from the laser radiating portion 1010. Laser light split by the beam splitter 1011 is directed to the generator 901 or the detector 903. The laser light directed to the generator 901 is transmitted through the time delay portion 1005. The time delay portion 1005 is composed of, for example, a movable mirror.

The delay portion 905 can also be so constructed that the time, at which terahertz radiation reaches the detector 903, is delayed. The delay portion can also be so constructed that a location irradiated with the laser light applied to the generator 901 is changed to vary a distance through which terahertz radiation is transmitted. Furthermore, the delay portion 905 can also be so constructed that the refractive index of a region through which terahertz radiation is transmitted is changed to vary the transmission speed of the terahertz radiation.

Further, the delay portion 905 can electrically perform the time delay. For example, the delay portion 905 can be so constructed that an electrical signal generated for mixture with a signal of detected terahertz radiation is time-delayed.

Reference numeral 906 designates a processing portion for obtaining information of a time waveform by sampling a signal that is detected by the detector 903, and obtained using the time delaying portion 905. The sampling can be executed, for example, at periods at which the laser light is applied, but the method of sampling is not limited thereto.

Reference numeral 908 designates an object holder for supporting an object 907. The object holder 908 can be composed of, for example, a plate formed of a resin, such as polyethylene, fluorine-containing polymer and polyimide, metal, such as aluminum, or an inorganic substance, such as quartz and sapphire. As in an embodiment of an endoscope described below, the holder 103 can be omitted. The object holder can be arranged or omitted according to the feature of the object, so that the distance can be favorably adjusted. Further, reference numeral 909 designates a distance changing portion (a Z-axis stage) for changing a distance between the sensor portion 904 and the object holder 908 or the object 907. The distance changing portion can be a piezoelectric device, but is not limited thereto. The distance changing portion 909 is operated on the basis of information of the time waveform obtained by the processing portion 906, and the distance is accordingly adjusted.

Use of information of the time waveform is not indispensable for adjustment of the distance. Information of terahertz radiation detected by the detector is indispensable. As an example of information of terahertz radiation, a change in the amplitude of terahertz radiation can be known from an integral value over a certain time interval (Δt) of the signal detected by the detector. Where information of the time waveform is used, a change in the phase or the like of the terahertz radiation can be obtained.

As described above, the distance can be adjusted by using interaction between the object 907 and leaking electromagnetic field of terahertz radiation transmitted through the transmission line 902. As explained above, the leaking electromagnetic field is electromagnetic field generated due to leakage of terahertz radiation transmitted through the transmission line 902.

It is preferable that the processing portion 906 stores information of a pulse waveform obtained under a condition in which no interaction occurs between the object 907 and the leaking electromagnetic field. It can thereby be decided that the interaction occurs, at the time of recognition of attenuation or delay of information of the time waveform relative to the above information of the pulse waveform. The processing portion 906 does not necessarily need to store the above information. A storing portion can be separately provided to store the above information.

Further, it is helpful to provide a storing portion for storing, as reference information, information of terahertz radiation detected by the detector under the condition in which no interaction occurs between the object and the leaking electromagnetic field. Thereby, occurrence of the interaction can be identified, when the information of terahertz radiation detected by the detector changes from the reference information.

It is also helpful to provide a moving portion (an X-Y stage) for moving the object holder 908 in a direction perpendicular to a direction of the distance to be changed by the distance changing portion. For example, a stepping motor can be used for the moving portion. When the moving portion moves the object holder based on the intensity of the leaking electromagnetic field, the following technical advantage can be attained. Even under the condition in which the distance remains unchanged, it is possible to increase the intensity and region of the interaction between the object 907 and the leaking electromagnetic field when the object holder is moved by the moving portion.

Further, it is helpful to generate the interaction between the object 907 and the leaking electromagnetic field while the transmission line is maintained away from the object 907. It is thereby possible to prevent deterioration of the sensor portion 904 due to contact between the sensor portion 904 and the object 907. The deterioration is considered to result from debasement and damage of substances of constituent components, such as the transmission line 902, of the sensor portion 904 due to influence of the object 907. The deterioration brings forth a decrease in intensity of terahertz radiation transmitted through the transmission line 907, and a change in intensity of the leaking electromagnetic field. As a result, the examination result is liable to vary. Accordingly, where the object is brought into contact with the transmission line, preferable reproducibility and examination result are difficult to obtain when the sensor portion 904 is used plural times.

In conventional examination processes, to cope with the above-described deterioration, the sensor portion 904 is usually washed or exchanged after each examination. Semiconductor crystal used for the generator 901 and the detector 903 is high in cost. The cost accordingly increases. Moreover, the number of operation steps increases due to the washing and exchange, and hence the throughput of examination process is likely to lower.

Further, it is helpful that the sensor portion 904 includes an examination transmission line for examining the object, and a distance adjustment transmission line for adjusting the distance. Electromagnetic radiation used for adjustment of the distance is transmitted through the distance adjustment transmission line. Electromagnetic radiation used for examination of the object is transmitted through the examination transmission line. Details thereof will be described in an embodiment of FIGS. 6 and 7 described below.

The sensor portion 904 can be arranged on a tip of an endoscope probe. In such a case, it is helpful that the sensor portion 904 is provided with a coarse moving portion for changing the distance in a coarse moving mode, and a fine moving portion for changing the distance in a fine moving mode. When the distance adjusting apparatus is disposed on the tip of an endoscope probe, the object can be examined based on information of terahertz radiation detected by the detector. Details thereof will be described in an embodiment of FIG. 8 described below.

Methods of adjusting the distance or examining the object by using terahertz radiation will be described. In this embodiment, a method includes steps as follows. Initially, terahertz radiation is generated under a condition in which the distance between the object and the transmission line for transmitting terahertz radiation is set at a first distance. The first distance is, for example, a distance ($L > L_0$) between the object 102 and the transmission line 121 shown by a condition [a] in FIG. 5.

Terahertz radiation generated under the condition of the first distance is detected under the same condition. Information of a time waveform (for example, a time waveform under the condition [a] in FIG. 5) of terahertz radiation detected under the condition of the first distance is acquired. As described above, acquisition of information of the time waveform is not always necessary. Only information of terahertz radiation is needed. Information of the terahertz radiation is preferably at least one of intensity, time waveform, amplitude, and phase of electromagnetic radiation, and frequency spectrum obtained by the Fourier transform. Further, information of the time waveform is preferably at least one of the time waveform itself, the intensity of time waveform, time width of the time waveform, and the frequency spectrum obtained by means of a Fourier transform.

Then, the transmission line or the object is moved to establish a second distance shorter than the first distance. The second distance is, for example, a distance ($L_0$) between the object 102 and the transmission line 121 shown by a condition [b] in FIG. 5. Terahertz radiation is generated at this second distance. Terahertz radiation generated at the second distance is detected under the same condition. Information of the time waveform (for example, the time waveform under the condition [b] in FIG. 5) of terahertz radiation detected under the condition that the second distance is $L_0$ is acquired. As mentioned above, information of the time waveform can be naturally replaced by information of terahertz radiation. The same holds true in the following description.

Further, information of time waveforms obtained under conditions of the first distance and the second distance are compared. Presence or absence of interaction between the object and the leaking electromagnetic field of terahertz radiation transmitted through the transmission line is judged based on presence or absence of a change in a result of the comparison of the time waveform. When no interaction exists, it is preferable to move the transmission line or the object to decrease the distance to a third distance shorter than the second distance. For example, where the second distance L is $L > L_0$, it is preferable to move the transmission line or the object to decrease the distance to the third distance $L_0$. Thereby, examination can be performed under the condition in which the interaction occurs. To paraphrase it, after the distance is adjusted, using information of the time waveform, so that the object 102 interacts with the leaking electromagnetic field of terahertz radiation transmitted through the transmission line, information of the time waveform is obtained to examine the object.

It is helpful to store information of the time waveform obtained under the condition of the first distance. Further, the stored information can be favorably used as the reference signal for comparison to information of the time waveform obtained under the condition of a distance different from the first distance. It is thereby possible to judge if the condition accompanies the interaction or not.

Further, it is preferable to execute a step of increasing the intensity of the leaking electromagnetic field from the transmission line, after the step of adjusting the distance. It is preferable to execute this step before the step of examining the object. In the step of increasing the intensity of the leaking electromagnetic field from the transmission line, it is preferable to change the transmission line for use from a first transmission line with weak leaking electromagnetic field to a second transmission line with leaking electromagnetic field stronger than that of the first transmission line. The intensity of the leaking electromagnetic field interacting with the object can thereby be increased. Further, in the step of increasing the intensity of the leaking electromagnetic field from the transmission line, it is also preferable to increase the intensity of generated terahertz radiation. The intensity of the leaking electromagnetic field can also be increased by this method.

More specific embodiments will now be described with reference to the drawings.

Figure 1:
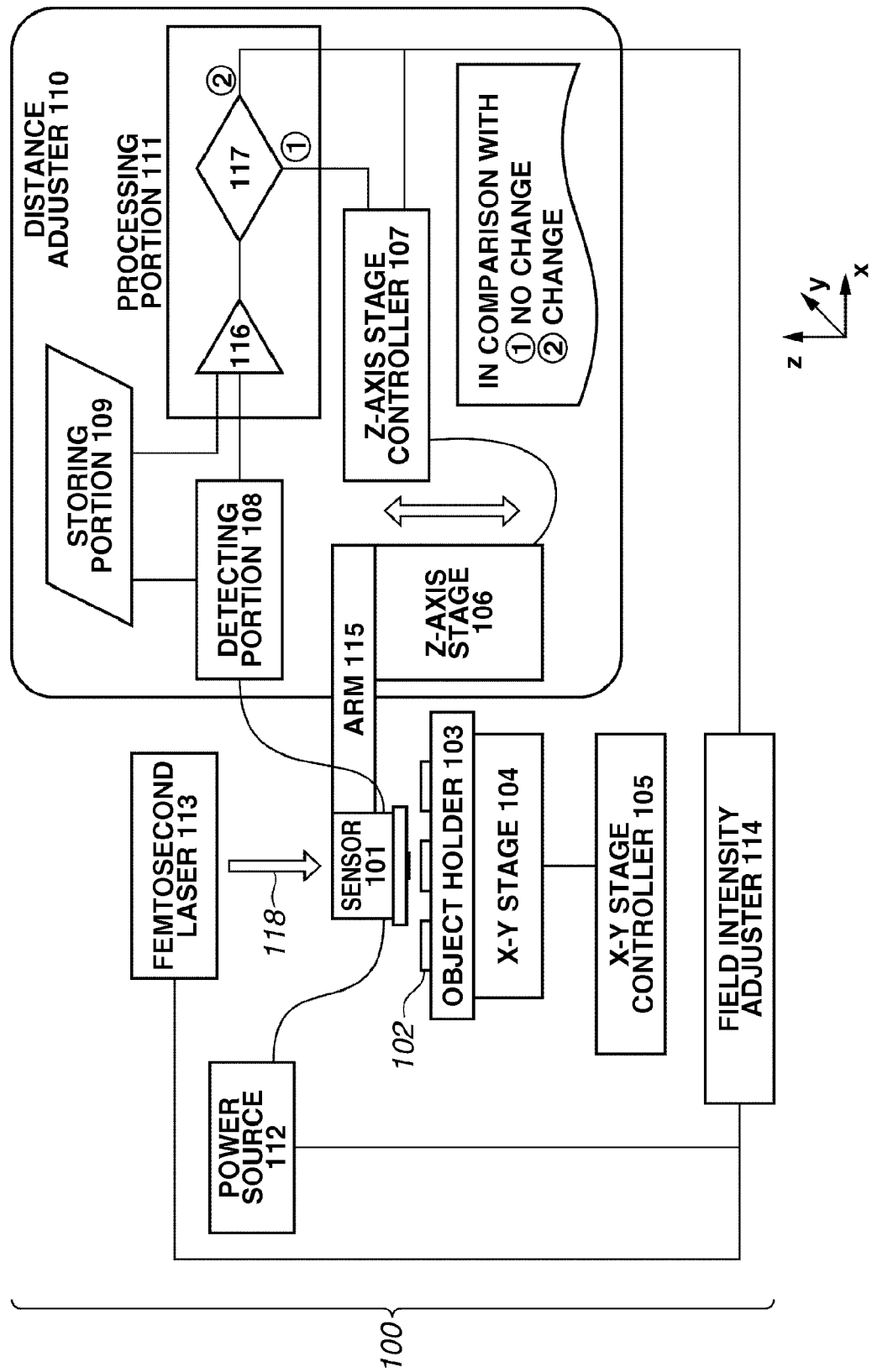
FIG. 1 is a schematic view illustrating an embodiment of apparatuses and methods according to the present invention.
Figure 2:
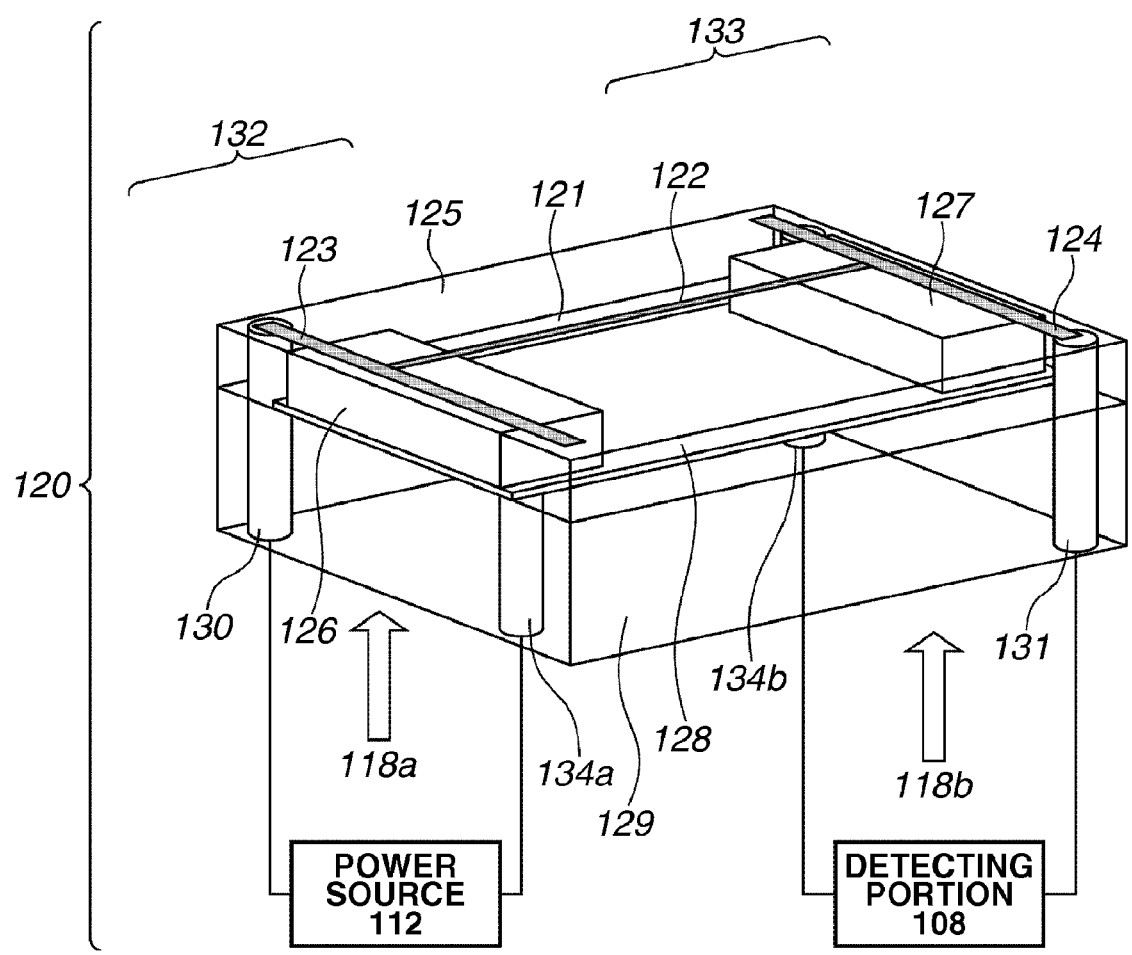
FIG. 2 is a view illustrating the structure of a sensor chip used in the embodiment of FIG. 1.
Figure 3:
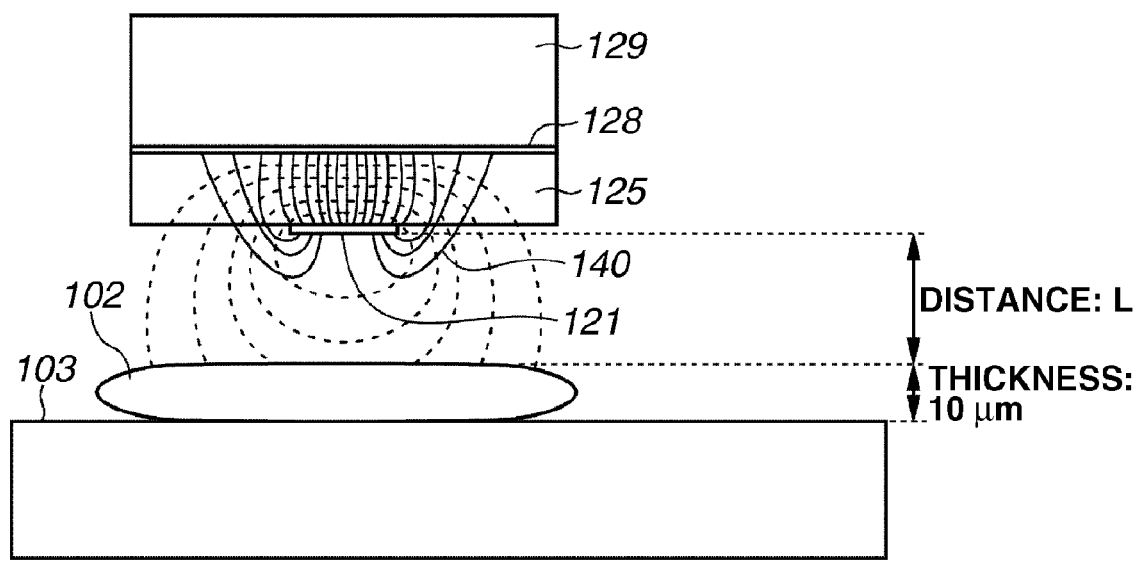
FIG. 3 is an enlarged view illustrating a portion around a sensor portion and an object in the embodiment of FIG. 1.
Figure 4A:
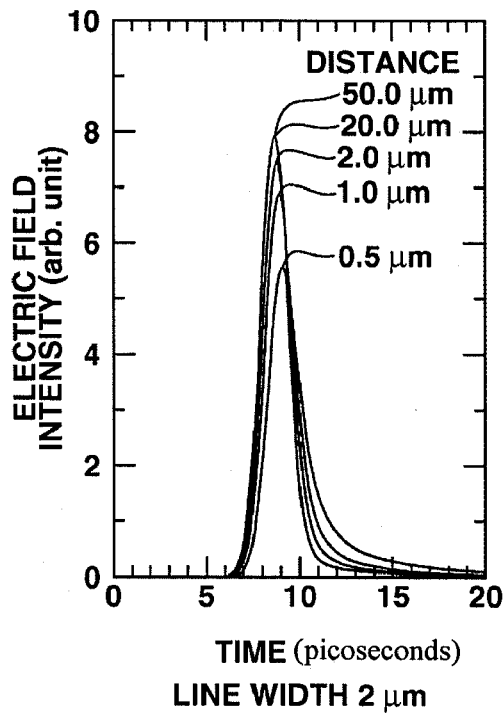
FIGS. 4A to 4D are graphs illustrating analytic examples of the relationship between a distance between a transmission line and an object, and a change in transmission conditions of terahertz radiation.
Figure 4B:
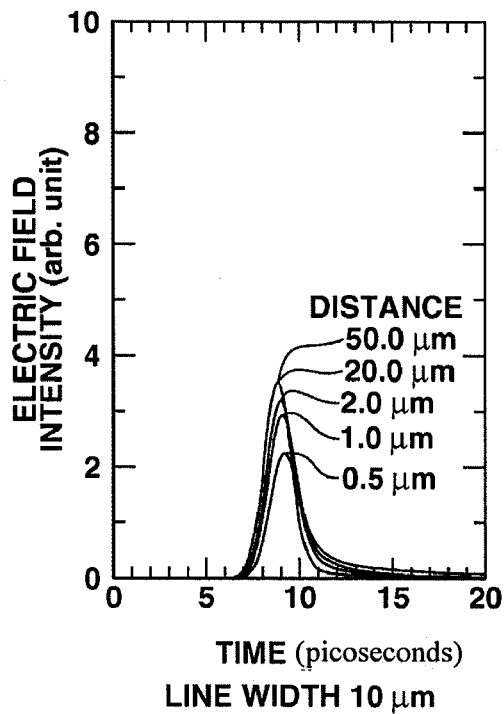
Figure 4C:
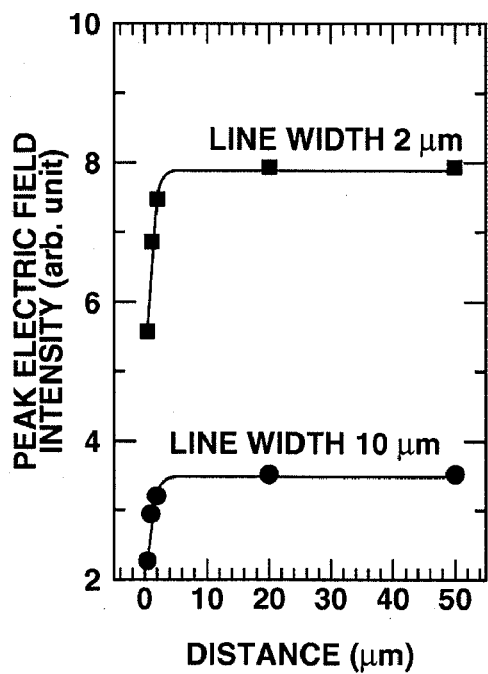
Figure 4D:
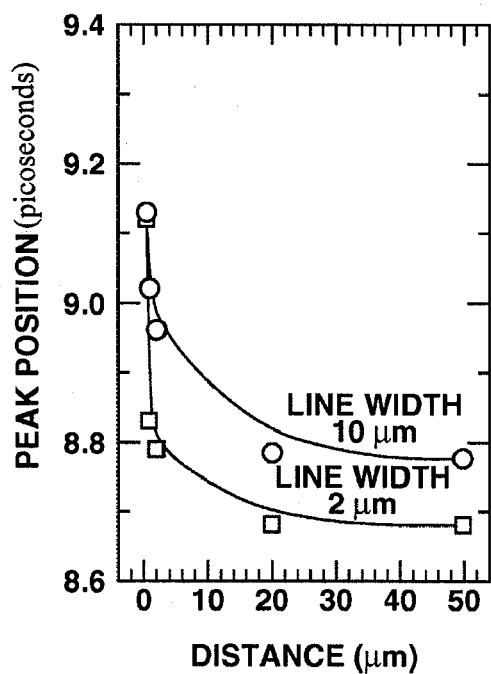

An embodiment of the distance adjusting or examining apparatus and method will be described with reference to FIGS. 1 to 5. FIG. 1 illustrates the structure of a distance adjusting or examining apparatus 100 of this embodiment. FIG. 2 illustrates the structure of a sensor chip 120 used in the apparatus 100 of FIG. 1. FIG. 3 is an enlarged view illustrating a region around a sensor portion 101 and an object 102 in the apparatus 100 of FIG. 1.

Figure 5:
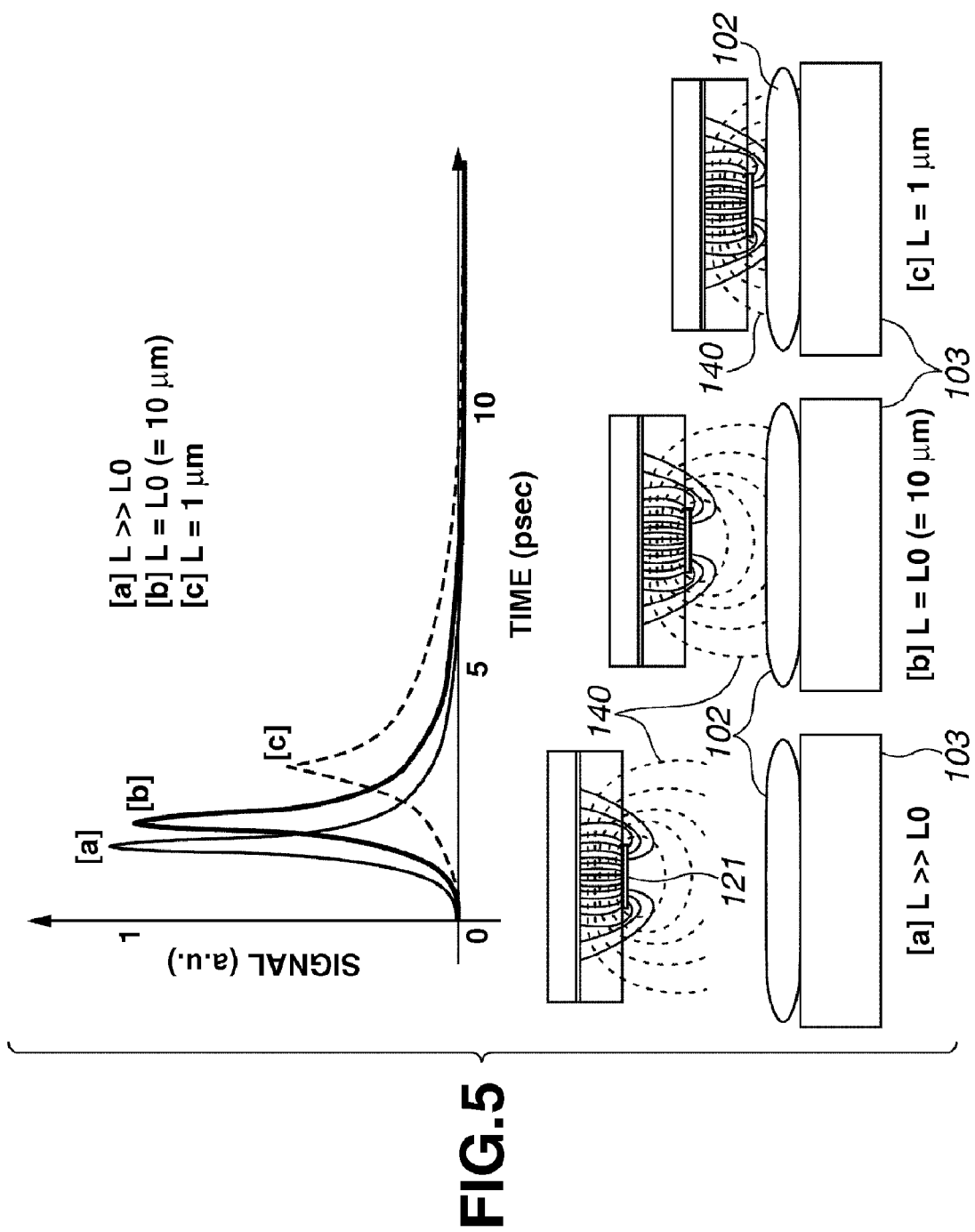
FIG. 5 is a view illustrating distances between a transmission line and an object, and changes in transmission conditions of terahertz radiation.

FIGS. 4A to 4D show examples of analysis of relationships between a change in transmission condition of terahertz radiation and the distance between the object and a transmission line in the sensor chip including microstrip lines with widths of 2 microns and 10 microns, respectively. FIG. 5 schematically illustrates transmission conditions (pulse waveforms) of terahertz radiation measured by a signal detecting portion 108, and relationships between the object 102 and leaking electromagnetic field in cases where the distance is adjusted to three values.

The structure of the examining apparatus 100 will be described. The examining apparatus 100 includes the sensor portion 101, a holder 103 for supporting the object 102, a distance adjuster 110 for adjusting the distance between the object 102 and the sensor portion 101, and an intensity adjuster 114 for adjusting the intensity of leaking electromagnetic field. The distance adjuster 110 adjusts the distance between the object 102 and the transmission line of the sensor portion 101 to a distance at which interaction between the object 102 and the leaking electromagnetic field from the transmission line occurs.

The structure and operation of the sensor portion 101 will be described. The sensor chip 120 for performing generation, transmission and detection of terahertz radiation is disposed on the sensor portion 101. As illustrated in FIG. 2 showing the sensor chip 120, a generator 132, a transmission line 121, a detector 133 a ground (GND) layer 128, a dielectric layer 125, through electrodes, and the like are integrated on a substrate 129. The sensor portion 101 is connected to a Z-axis stage 106 through an arm 115. The Z-axis stage 106 is a precision stage that can execute a coarse movement in a micron order with a stepping motor and a fine movement in a nanometer order with a piezoelectric actuator. The Z-axis stage 106 is controlled by a Z-axis stage controller 107.

In the sensor chip 120, as illustrated in FIG. 2, the generator 132 is comprised of a generating signal line 123, a generating semiconductor layer 126, a generating through electrode 130, the GND layer 128, and a GND through electrode 134a. The generator 132 generates terahertz radiation. The generator 132 is electrically connected to a generating power source 112 through the generating through electrode 130 and the GND through electrode 134a. The detector 133 is comprised of a detecting signal line 124, a detecting semiconductor layer 127, a detecting through electrode 131, the GND layer 128, and a GND through electrode 134b. The detector 133 detects terahertz radiation. The detector 133 is electrically connected to the detecting portion 108 through the detecting through electrode 131 and the GND through electrode 134b. Power supply for generation and detection is thus performed from the bottom surface of the sensor chip 120, using the through electrodes. Accordingly, contact between the object 102 and the sensor chip 120 through a power supplier can be prevented.

The examining apparatus of this embodiment uses the transmission line 121 of the microstrip line type with the line width of 2 microns. Terahertz radiation generated by the generator 132 is coupled to the transmission line 121, and transmitted through the dielectric between an upper electrode layer 122 and the GND layer 128. Terahertz radiation is then coupled to the detector 133, and taken out as an electric signal by the signal detecting portion 108. The transmission line 121 is not limited to the microstrip line. For example, a transmission line of coplanar waveguide type, or the like can also be used.

Constituent materials of the sensor chip 120 of this embodiment will be described. The substrate 129 is a substrate of synthetic quartz through which radiation pulse at a wavelength of 810 nm can be transmitted. Each of the generating semiconductor layer 126 and the detecting semiconductor layer 127 is composed of a low-temperature-grown (LTG) gallium arsenide layer with the thickness of 2 microns that is transferred to the substrate 129 by thermo compression bonding of Au. Each of the upper electrode layer 122 of the transmission line 121, the generating signal line 123, and the detecting signal line 124 is composed of a Ti/Au layer (20 nm/200 nm). The GND layer 128 is composed of a Ti/Au/Ti layer (20 nm/500 nm/20 nm). The GND layer 128 also acts as a junction layer at the time of thermo compression bonding. The dielectric layer 125 has the thickness of 3 microns, and is composed of benzocyclobutene (BCB) that is a preferable dielectric material with low loss for terahertz radiation. Further, each of the generating through electrode 130, the GND through electrode 134a, the detecting through electrode 131, and the GND through electrode 134b is composed of Cu that has a favorable electric conductivity, and is easy to be a buried layer. The above-described constituent materials are only for exemplification, and materials are not limited to those described above.

Generation and detection of terahertz radiation in this embodiment will be described. A well-known optical switch system is used for generation and detection of terahertz radiation in this embodiment. In the optical switch system, light pulses 118 for optical gating are emitted from a femtosecond laser 113, such as a 810 nm Ti; sapphire laser, and split into light pulses 118a for generation and light pulses 118b for detecting by a beam splitter (not shown), or the like. The light pulses 118a for generation are applied to the generator 132 of the sensor portion 101. The light pulses 118b for detection are applied to the detector 133 of the sensor portion 101 through a time delay optical system (not shown).

A bias voltage is applied across a portion of the generation semiconductor layer 126 between the generation signal line 123 and the GND layer 128 by the power source 112. Under such a condition, the light pulses 118a are applied to the voltage-applied portion of the generation semiconductor layer 126 through a slit (not shown) formed in the GND layer 128. Hence, the generation semiconductor layer 126 is optically gated, and terahertz radiation is generated as photocurrent is excited. The terahertz radiation is coupled to the transmission line 121.

When the terahertz radiation propagates along the transmission line 121, a small amount of electromagnetic field leaks from the transmission line 121. FIG. 3 illustrates electromagnetic field 140 leaking from the microstrip line on the sensor chip 120 when the terahertz radiation is transmitted in a direction perpendicular to the sheet of FIG. 3. The intensity of the leaking electromagnetic field 140 is mainly determined from constituent material, shape, configuration of the transmission line, intensity of the terahertz radiation, and the like. Accordingly, under approximately the same condition of surroundings, atmosphere, and ambience, the above-mentioned parameters determine the intensity of the leaking electromagnetic field, and a region to which influence of the leaking electromagnetic field extends. Where the object 102 is disposed near the transmission line 121, interaction between the leaking electromagnetic field 140 and the object 102 occurs. Thus, the transmission condition of terahertz radiation transmitted through the transmission line 121 changes. In the apparatus and method of the present invention, such a change in the transmission condition is used to obtain information of the object 102.

Terahertz radiation transmitted through the transmission line 121 reaches the detector 133. In the detector 133, a bias voltage is applied across a portion of the detecting semiconductor layer 127 between the detection signal line 124 and the GND layer 128 by the signal detecting portion 108. Similar to the generator, light pulses 118b transmitted through the time delay system are applied to the voltage-applied portion from the bottom surface of the substrate 129. The detecting semiconductor layer 127 is optically gated by the light pulses 118b, and photocurrent is generated therein. Sampling of the photocurrent is executed by the signal detecting portion 108, and the transmission condition of terahertz radiation is detected in the form of an electric signal.

Generating and detecting methods of terahertz radiation are not limited to these described above. For example, semiconductor devices with a gain for electromagnetic radiation, such as a resonance tunnel diode and a Gunn diode, can be used in the generator. Further, detection devices, such as a Schottky barrier diode, can be used in the detector.

The structure around the sensor portion 101 and the object 102 will be described. As illustrated in FIG. 3, the object 102 is supported by the object holder 103 such that the object 102 faces the transmission line 121 in the sensor portion 101. Further, the object 102 is disposed away from the transmission line 121 with a gap therebetween. Here, the distance between the surface of the transmission line 121 and the surface of the object 102 is represented by "L". The distance L is adjusted by the distance adjuster 110 based on a detection signal of terahertz radiation detected by the signal detecting portion 108. The object 102 is, for example, bio-molecules, chemicals, or polymers. In this embodiment, DNA dissolved in a buffer solution of phosphoric acid is used. The object is normally disposed with a predetermined thickness under a dried condition.

The object holder 103 is, for example, a plate formed of resin, such as fluorine-containing polymer and polyimide, metal, such as aluminum, or an inorganic substance, such as quartz and sapphire. In this embodiment, the holder 103 is made of polyethylene resin that is relatively cheap and easy to mold. The object 102 with a volume of several tens of nano-liters is dripped on the holder 103 by a micro-dripping device, such as a micro-injector. The object holder 103 is mechanically fixed to an X-Y stage 104, and the position of the holder 103 is controlled in an X-Y plane by an X-Y stage controller 105. The X-Y stage 104 is comprised of a precision stage that is movable in a micron order by a stepping motor. For the purposes of improving the examination efficiency (throughput), a plurality of objects 102 can be disposed on the object holder 103 (see FIG. 1). In such a case, the objects 102 are so moved one by one that each faces the transmission line 121 to be examined.

Structures of the distance adjuster 110 and the field intensity adjuster 114 will be described. The distance adjuster 110 includes the signal detecting portion 108, a signal storing portion 109, a processing portion 111, the Z-axis stage 106, and the Z-axis stage controller 107. These elements are connected to each other, as illustrated in FIG. 1. The processing portion 111 includes a comparing portion 116, and a judging portion 117. In the examining apparatus 100 of this embodiment, the distance L between the surface of the object 102 and the surface of the transmission line 121 in the sensor portion 101 is adjustable based on a change in the detection signal supplied from the sensor portion 101. Such a means for performing the adjustment is called the distance adjuster 110 or the distance changing portion in this specification.

Signals are supplied from the processing portion 111 to a power source 112 and the femtosecond laser 113 through the field intensity adjuster 114, respectively.

The distance adjuster 110 adjusts the distance between the sensor chip 120 and the object 102 based on a change in the detection signal from the sensor portion 101, using the following system. Sampling of terahertz radiation detected by the sensor portion 101 is executed in the signal detecting portion 108, and the detection signal in the pulse waveform is supplied to the signal storing portion 109 and the comparing portion 116 in the processing portion 111. The signal storing portion 109 stores the detection signal, and supplies a reference signal to the comparing portion 116. The reference signal is typically the transmission condition (pulse waveform) of terahertz radiation obtained by the signal detecting portion 108 under a condition in which no interaction occurs between the object 102 and the leaking electromagnetic field 140 (see the condition [a] in FIG. 5).

In a case where interaction between the object 102 and the leaking electromagnetic field 140 has already appeared before the distance L is changed, the reference signal can be the pulse waveform detected under a condition in which the distance L is not yet changed at all. Also in such a case, the distance between the object 102 and the sensor chip 120 can be precisely adjusted to a target distance.

In the comparing portion 116, the pulse waveform of the reference signal stored in the signal storing portion 109 and the pulse waveform of the detection signal supplied from the signal detecting portion 108 are compared. The judging portion 117 judges presence or absence of a significant difference between these two pulse waveforms. According to the judging result, the judging portion 117 supplies a signal to the Z-axis stage controller 107 to control the motion of the Z-axis stage 106 in the Z-axis direction. Although the sensor portion 109 is moved in this embodiment, the object holder 103 can be moved in the Z-axis direction instead. In other words, the sensor portion 101 and the object 102 are moved in the Z-axis direction relatively to each other, and the distance between the surface of the transmission line 121 in the sensor portion 101 and the surface of the object 102 is changed.

The examining method of this embodiment including the distance adjuster 110 and the leaking electromagnetic field adjuster 114 will now be described.

In a case where the transmission line is far away from the object as illustrated in the condition [a] of FIG. 5, i.e., where no interaction occurs between the leaking electromagnetic field 140 from the transmission line 121 and the object 102 that is disposed at the distance L from the transmission line 121, the pulse waveform [a] specific to the transmission line 121 can be obtained. This is the reference signal in this embodiment. This is determined by the structure of the sensor chip 120 and the intensity of terahertz radiation. According to the analytic result, this reference signal corresponds to the pulse waveform obtained when the distance L is equal to 50 microns.

Thus, where the sensor portion 101 is sufficiently away from the object 102, the pulse waveform from the signal detecting portion 108 is the reference signal. In such a case, the judging portion 117 supplies a signal representative of "no change" to the Z-axis stage controller 107. Upon receipt of this signal, the Z-axis stage controller 107 moves the Z-axis stage 106 in a coarse moving mode (for example, a mode in which the Z-axis stage is moved with a step in a range between 1 mm and 1 micron). Then, the sensor portion 101 executes examination of the transmission condition of terahertz radiation.

While the transmission condition of terahertz radiation is measured, the Z-axis stage 106 is moved to move the sensor chip 120 closer to the object 102. In due course of time, the distance L reaches a distance at which the pulse waveform [b] with a slight attenuation or time delay as compared to the reference signal can be obtained. As illustrated in the condition [b] of FIG. 5, this distance is a distance (distance $L_0$) at which the leaking electromagnetic field 140 begins to interact with the object 102. The distance $L_0$ is determined by the constituent material, shape, or structure of the transmission line, the intensity of terahertz radiation, and the like. When the distance $L_0$ is detected through detection of the start of the interaction, the Z-axis stage controller 107 of the examining apparatus 100 recognizes a relative distance between the surface of the object 102 and the sensor chip 120.

Based on the analytic result, the sensor chip in this embodiment knows that a change in the intensity and a phase delay of the terahertz radiation occur when the distance L between the transmission line and the object reaches about 10 microns. Therefore, the Z-axis stage controller 107 can recognize the relative distance between the surface of the object 102 and the sensor chip 120. FIGS. 4A to 4D show that the change in the field intensity (a change in peak electric field intensity) and the phase delay (a shift in peak position) begins to appear clearly when the distance L reaches about 10 microns.

At this time, the processing portion 111 judges that there is a significant difference in the pulse waveform between the detection signal and the reference signal, and supplies an appropriate signal to the Z-axis stage controller 107. The control mode of the controller 107 is changed from the coarse moving mode to such a fine moving mode in which the Z-axis stage 106 is moved with a fine moving step in a rage between 1 micron and 10 nanometers.

Further, while the transmission condition of terahertz radiation is examined, the Z-axis stage 106 is moved to bring the distance between the sensor chip 120 and the object 102 close to a distance $L_m$ (for example, $L=L_m=1$ micron, and see the condition [c] in FIG. 5). This distance is acquired when the Z-axis stage 106 is moved step by step with a known amount in the fine moving mode after the Z-axis stage controller 107 recognizes the distance $L_0$.

At this stage, sufficiently strong interaction occurs between the object 102 and the leaking electromagnetic field 140. In other words, terahertz radiation transmitted through the transmission line 121 strongly interacts with the object 102. Therefore, the transmission condition of terahertz radiation transmitted through the transmission line 121 varies, and it is possible to obtain the pulse waveform [c] which shows strong attenuation and time delay as compared to the reference signal. In the sensor chip 120 of this embodiment, it is known from the analytic result that the field intensity and the phase delay change approximately exponentially as the distance L changes in a region wherein the distance L is below 10 microns. Further, in this embodiment, under the distance condition of $L=L_m=1$ micron, examination can be executed while non-contact condition is maintained between the transmission line and the object.

The above-described examining method includes a step of preparing a sensor provided with a terahertz radiation generator, a transmission line, and a detector, a step of placing an object at an appropriate location, a step of relatively moving the object in the coarse moving mode, a step of recognizing the distance, a step of adjusting the distance, and a step of obtaining information of the object. In the step of placing the object, the object 102 is disposed at a position facing the transmission line 121 of the sensor chip 120 and away from the transmission line 121. In the step of the coarse moving, while the detection signal from the detector 133 for detecting terahertz radiation generated by the generator 132 and transmitted through the transmission line 121 is monitored, the distance between the transmission line and the object is decreased. In the distance recognition step, the distance $L_0$, at which the interaction between the leaking electromagnetic field 140 from the transmission line 121 and the surface of the object 102 begins to occur, is recognized based on the change in the detection signal from the detector 133. In the distance adjusting step, after the recognition of the distance, the distance between the transmission line 121 and the object 102 is adjusted to a target distance at which the leaking electromagnetic field from the transmission line 121 interacts with the object 102. In the information obtaining step, information of the object is obtained under the condition of the target distance based on the detection signal from the detector 133 reflecting the interacting condition between the object 102 and the terahertz radiation transmitted through the transmission line 121.

The following operation can be added. Between the distance recognition step and the information obtaining step, an appropriate signal can be supplied to the field intensity adjuster 114 from the processing portion 111, and the bias voltage applied across the generating semiconductor layer 126 from the power source 112 can be changed from 5 V to 20 V. Further, an appropriate signal can be supplied to the femtosecond laser 113 from the field intensity adjuster 114, and light power of the light pulse 118 for optically gating the generating semiconductor layer 126 can be changed from 1 mW to 10 mW. Thereby, the intensity of terahertz radiation generated by the generator 132 is increased, and the intensity of the leaking electromagnetic field from the transmission line 121 is increased. Accordingly, the intensity and region of the interaction between the object 102 and the leaking electromagnetic field 140 are effectively increased. Under this condition, the transmission condition of terahertz radiation is detected by the signal detecting portion 108, and information, such as characteristics, of the object is acquired. This step of increasing the leaking electromagnetic field can be executed after the distance recognition step, or the distance adjusting step.

In the examining apparatus and method of this embodiment, while the transmission condition of terahertz radiation transmitted through the transmission line 121 of the sensor portion 101 is monitored, the detection signal is compared to the reference signal. And, the distance between the object 102 and the sensor portion 101 is decreased by the distance adjuster 110. Thus, the distance ($L_0$), at which interaction between the surface of the object 102 and the electromagnetic field 140 slightly leaking from the transmission line 121 begins to occur, is recognized. The relative distance between the sensor chip 120 and the object 102 can be acquired based on the change in the transmission condition of terahertz radiation. Further, when the distance adjuster 110 is operated, the distance between the object 102 and the sensor chip 120 can be decreased below the distance $L_0$, and the distance can be adjusted to a favorable distance at which the leaking electromagnetic field 140 sufficiently interacts with the object 102. When the distance between the object 102 and the transmission line is thus adjusted, the distance between the transmission line and the object can be uniquely determined. Hence, examination with favorable sensitivity and reproducibility can be achieved.

Further, the examining apparatus can include the field intensity adjuster 114. In such a structure, under the condition in which the distance between the transmission line and the object is decreased so that the interaction occurs, the intensity of the leaking electromagnetic field from the transmission line can be further increased. Under such a condition, the interaction condition between the leaking electromagnetic field from the transmission line and the object can be obtained as the transmission condition of terahertz radiation. Information, such as characteristics, of the object, can be thereby acquired with high sensitivity, using terahertz radiation.

According to the examining apparatus of this embodiment, the condition between the transmission line and the object can be uniquely determined by adjusting the distance between the transmission line and the object. Hence, examination with favorable sensitivity and reproducibility can be achieved. Further, examination can be achieved at higher speed and lower cost by using the leaking electromagnetic field, as compared to the conventional on-chip examination. In addition, the terahertz radiation examination using the leaking electromagnetic field can be applied to in-situ observations in microscopes, and the like. Moreover, examination can be performed under the non-contact condition between the transmission line and the object. Accordingly, deterioration of the sensor can be prevented, and the frequency of washing and exchange of the sensor can be reduced, leading to achievement of more economical examination of the object.

In the conventional on-chip examination, it is difficult to apply a system for examining the interaction between the object and the leaking electromagnetic field to in-situ observation and in-situ examination in microscopes, and the like. Here, the conventional on-chip examination is, for example, that disclosed in the above-mentioned APL article. From the viewpoint of examining sensitivity and reproducibility, it is important uniquely to determine the condition between the object and the transmission line. In the above-mentioned APL article, there is neither disclosure nor suggestion of the concept of the present invention of adjusting the above-described distance.

As described in the foregoing, the present invention aims at adjustment of the distance using the leaking electromagnetic field. The present invention differs from technology for calculating a distance to an object by measuring transmission time taken from generation of terahertz radiation to detection thereof via reflection of the terahertz radiation by the object.

Figure 6:
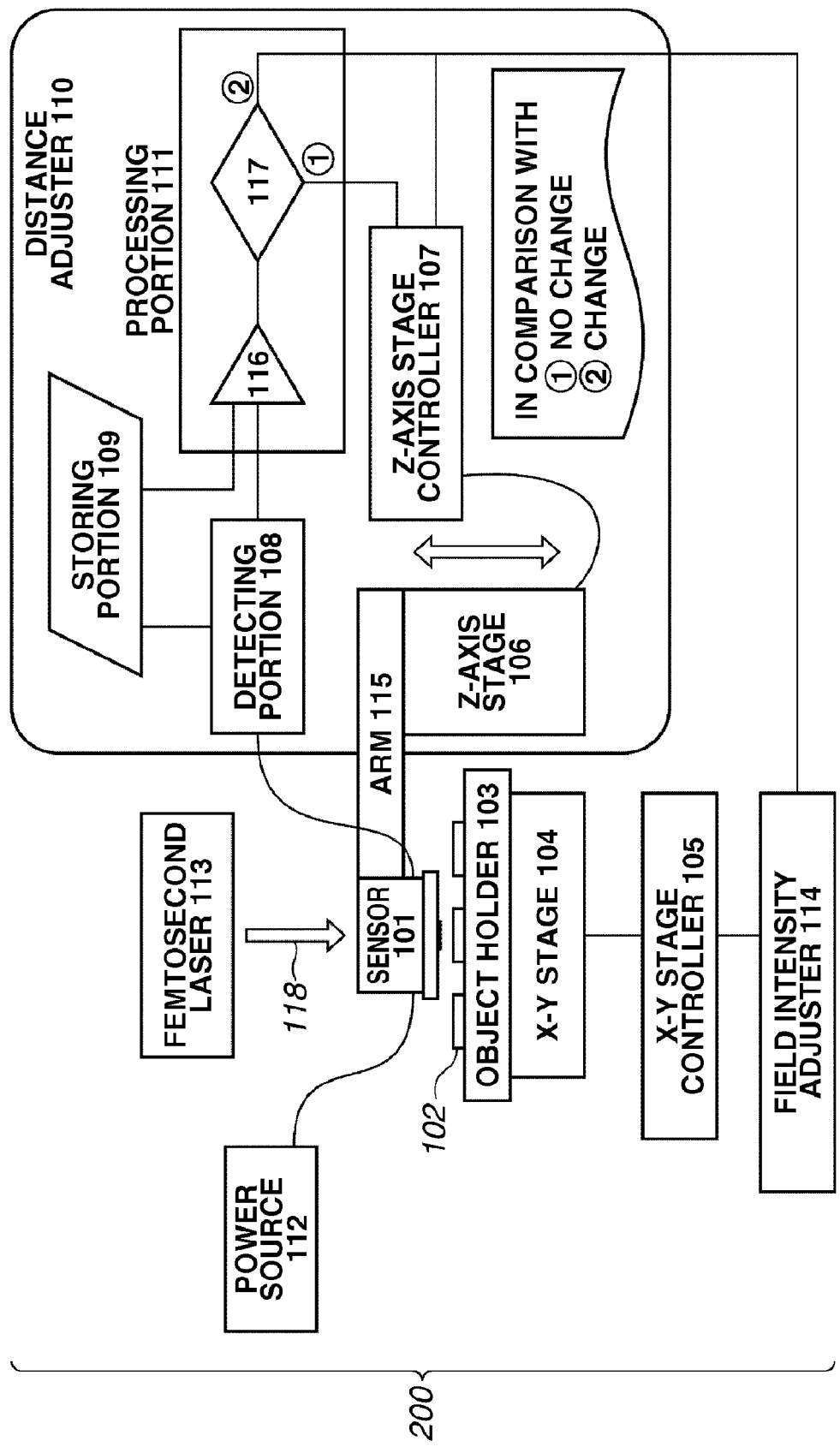
FIG. 6 is a schematic view illustrating another embodiment of apparatuses and methods according to the present invention.
Figure 7:
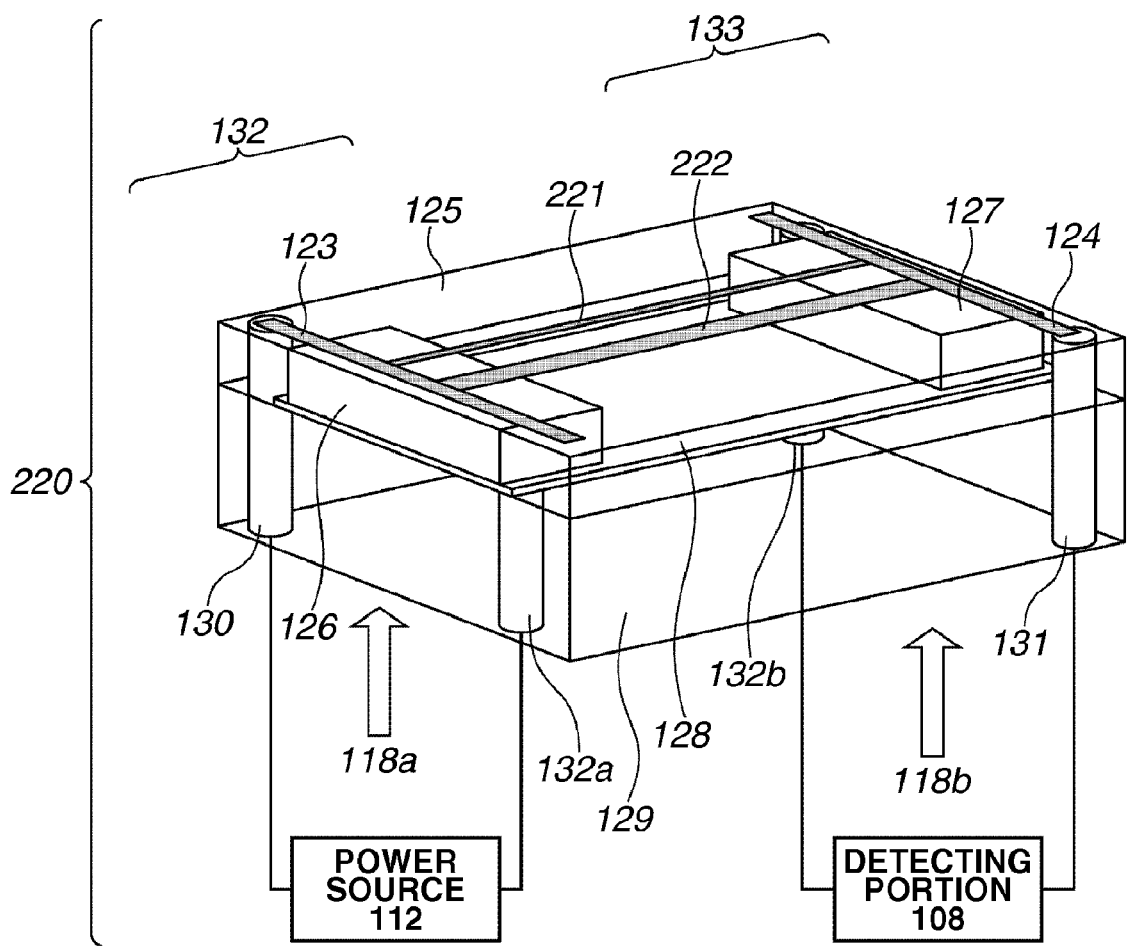
FIG. 7 is a view illustrating the structure of a sensor chip used in the embodiment of FIG. 6.

An embodiment including a transmission line for examination of the object and a transmission line for adjustment of the distance will be described. FIG. 6 illustrates the structure of a distance adjusting or examining apparatus 200 of this embodiment. FIG. 7 illustrates the structure of a sensor chip 220 used in this embodiment.

The apparatus of this embodiment includes the sensor portion 101, the object holder 103 for supporting the object 102, the distance adjuster 110 for adjusting the distance between the object 102 and the sensor portion 101, the field intensity adjuster 114, and the like. In this embodiment, the field intensity adjuster 114 is connected to the X-Y stage controller 105 for moving the X-Y stage 104 in the X-Y plane.

In this embodiment, as illustrated in FIG. 7, the sensor chip 220 has the structure wherein the generator 132, an examination transmission line 221, a distance adjustment transmission line 222, the detector 133, the GND layer 128, the dielectric layer 125, the through electrode 130, and the like are integrated on the substrate 129. Similar to the embodiment of FIG. 1, the system of the optical switch is adopted for generation and detection of terahertz radiation. Further, the transmission line of the microstrip line type is used as each of the examination transmission line 221 and the distance adjustment transmission line 222.

The transmission line 221 is comprised of a microstrip line with the length of 300 microns and the line width of 2 microns, and is used for examination of the object 102. In contrast therewith, the transmission line 222 is comprised of a microstrip line with the length of 300 microns and the line width of 10 microns, and is used for adjusting the distance between the object 102 and the sensor chip 220. The examination transmission line 221 and the distance adjustment transmission line 222 are arranged in parallel with the interval of 50 microns therebetween.

Generally, the intensity of the leaking electromagnetic field from the transmission line is determined by the material, shape, and configuration of the transmission line, the intensity of terahertz radiation signal, and the like. With the microstrip line, the intensity and region of the leaking electromagnetic field increase as the line width decreases, provided that remaining factors are the same. Namely, where the distance L between the object and the transmission line is the same, terahertz radiation transmitted through the transmission line with a thinner line width interacts with the object more strongly.

In the examining apparatus of this embodiment, initially, the distance between the object 102 and the distance adjustment transmission line 222 is adjusted by monitoring interaction between the object 102 and the leaking electromagnetic field from the transmission line 222. The distance L between the object 102 and the distance adjustment transmission line 222 is adjusted by the distance adjuster 110 to a distance at which interaction between the object 102 and the leaking electromagnetic field from the distance adjustment transmission line 222 occurs. This step is executed in the same manner as the above-described embodiment.

Upon completion of the first step, the field intensity adjuster 114 supplies an appropriate signal to the X-Y stage controller 105 to move the X-Y stage 104 by 50 microns in the horizontal direction. Thus, the object 102 is brought to a position right below the examination transmission line 221. Under the examination transmission line 221 with a thinner line width, the intensity and region of the interaction between the object 102 and propagating terahertz radiation effectively increase even under a condition of the same distance L. Under this condition, the transmission condition of terahertz radiation is detected by the signal detecting portion 108 to obtain information of the object 102. FIGS. 4A to 4D illustrate differences of the change in the field intensity and the phase delay between the examination transmission line 221 and the distance adjustment transmission line 222 under the condition of the same distance L.

In the step of increasing the leaking electromagnetic field, both the method described in the above-described embodiment and the method described in this embodiment can be used. Although this embodiment adopts two kinds of transmission lines, more than three kinds of transmission lines with different leaking electromagnetic fields can be arranged. In such a cases at least one transmission line is the distance adjustment transmission line, and at least one transmission line is the examination transmission line.

As described above, more than two kinds of transmission lines with different intensities of leaking electromagnetic fields are arranged in this embodiment. In the first step, the distance L is adjusted by using the first transmission line with a relatively weak leaking electromagnetic field. Then, the transmission condition of terahertz radiation is examined by using the second transmission line with leaking electromagnetic field the intensity of which is stronger than that of the first transmission line. Examination with higher sensitivity can thereby be achieved.

Similar to the above-described embodiments, also in this embodiment, the condition between the transmission line and the object can be uniquely determined by adjusting the distance between the transmission line and the object. Accordingly, examination with preferable examination sensitivity and reproducibility can be achieved in this embodiment. Further, as compared to the on-chip examination, examination using the leaking electromagnetic field can be achieved at higher speed and lower cost. Furthermore, the examination using the leaking electromagnetic field of terahertz radiation can be applied to in-situ observation in microscopes, and the like. Moreover, the examination can be performed under the non-contact condition between the transmission line and the object. Accordingly, deterioration of the sensor can be prevented, and the frequency of washing and exchange of the sensor can be reduced, leading to more economical examination of the object.

Figure 8A:
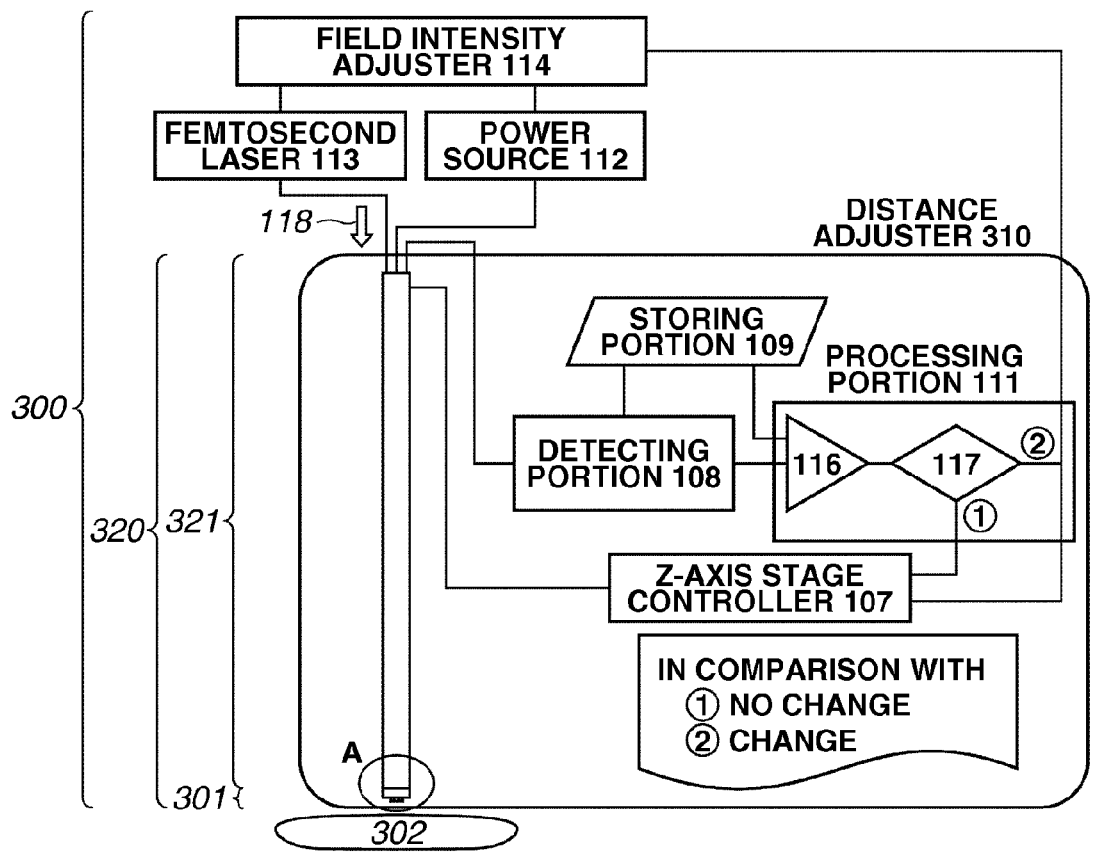
FIGS. 8A to 8C are views illustrating another embodiment of an endoscope system according to the present invention.
Figure 8B:
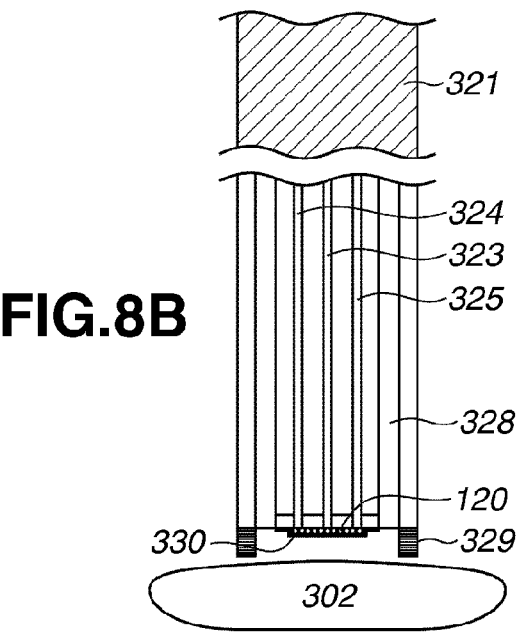
Figure 8C:
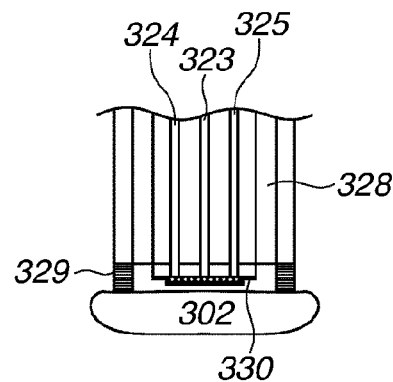

An embodiment using an endoscope will now be described. FIG. 8 illustrates an endoscope system of this embodiment using the examining apparatus and method of the present invention. FIG. 8A illustrates the entire structure of the system of this embodiment. FIG. 8B illustrates the enlarged cross section of a region A in FIG. 8A. FIG. 8C illustrates a condition of the sensor portion at the time of examination. In FIGS. 8A to 8C, the same elements as those in the above-described embodiments are designated by the same reference numerals.

The structure of an endoscope system 300 of this embodiment will be described. The endoscope system 300 is comprised of an endoscope probe 320, a distance adjuster 310 for adjusting the distance between an object 302 and a sensor portion 301, and other elements described in the above-described embodiments. The endoscope probe 320 is comprised of the sensor portion 301, a flexible tube 321, a Z-axis coarse moving portion 328, a Z-axis fine moving portion 329, and the like.

Fitted into the flexible tube 321 are a generation optical fiber 324, a detection optical fiber 325, a signal line 323, the Z-axis coarse moving portion 328, and the like. At a tip portion of the flexible tube 321, the Z-axis fine moving portion 329 is disposed. It can execute a fine movement in a nanometer order using a piezoelectric actuator. In this embodiment, a rotary micro stage is used as the Z-axis coarse moving portion 328 that can execute a coarse movement in a micron order. The rotary micro stage includes a cylindrical member that has a fine internal thread surface rotatably fitted into the flexible tube 321, and a circular member with a fine external thread surface, to which the sensor chip 120 is fixed. When the cylindrical member is rotated, the circular member is moved in an axial direction of the flexible tube 321. FIG. 8B illustrates a condition in which the circular member with the sensor chip 120 fixed thereto is retracted inward, and FIG. 8C illustrates a condition in which the circular member protrudes outward.

The sensor portion 301 is comprised of the above-described sensor chip 120 arranged at the tip portion of the endoscope 320. The sensor chip 120 is connected to the femtosecond laser portion 113 through the generation optical fiber 324 and the detection optical fiber 325, and connected to the signal detecting portion 108 and the power source 112 through the signal line 323. Further, a surface of the sensor chip 120 is coated with a protective layer 330 of SOG (spin-on-glass) film having the thickness of about 50 nanometers. Thus, deterioration and damage of the sensor portion are prevented. Also in this embodiment, the optical switch system is used for generation and detection of terahertz radiation, and the transmission line of the microstrip line type is used as the examination transmission line 121.

The endoscope system in this embodiment is operated as follows. An example will be described, in which the endoscope probe 320 is inserted into a human body, and the inner wall surface of an organ in a body is examined. The sensor chip 120 is operated as described in the above-described embodiments.

First, in the first coarse moving step of inserting the endoscope probe 320, the tip portion of the endoscope probe 320 is brought into contact with the inner wall surface of the object 302. The Z-axis fine moving portion 329 including the piezoelectric actuator disposed at the tip portion of the endoscope detects the contact between the object 302 and the tip portion of the endoscope.

In the second coarse moving step, while the transmission condition of terahertz radiation is examined by the sensor portion 301, the Z-axis coarse moving portion 328 is operated to bring the sensor chip 120 closer to object 102. Upon detection of the distance $L_0$ at which the interaction begins and the transmission condition of terahertz radiation changes, the mode is changed to the fine moving mode. Thus, the Z-axis fine moving portion 329 is operated to bring the distance to a target distance (see FIG. 8C). Under the condition in which the distance is adjusted to a preferable distance at which the leaking electromagnetic field sufficiently interacts with the object, information of characteristics of the inner wall of the organ in a body is acquired based on the detection signal of the detector 133 that reflects the condition of interaction between the object and terahertz radiation transmitted through the transmission line 121.

Also in this embodiment wherein the examination using the leaking electromagnetic field of terahertz radiation is applied to the endoscope, examination can be achieved under a preferable distance condition in which sufficient interaction occurs, since the distance adjuster or distance changing portion specific to the present invention is provided. Thus, endoscope examination with high sensitivity and reproducibility is achieved. Although the examination of the organ in a body is described in this embodiment, the endoscope system of this embodiment can also be applied to, for example, an industrial endoscope for examining a minute tube, a narrow space, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application Nos. 2007-224942, filed Aug. 31, 2007, and 2008-165175, filed Jun. 25, 2008, which are hereby incorporated by reference herein in their entirety.

What is claimed is:

1. A distance adjusting apparatus having a transmission line for transmitting terahertz radiation and for adjusting a distance between the transmission line and an object by using the terahertz radiation, said apparatus comprising:

a generator for generating the terahertz radiation transmitted through the transmission line;

a detector for detecting the terahertz radiation transmitted through the transmission line;

a distance changing portion configured to change the distance in a direction across a transmission direction of the terahertz radiation through the transmission line; and a controlling portion configured to control the distance changing portion, wherein said apparatus is configured such that the terahertz radiation transmitted through the transmission line and the object interact with each other, and wherein the distance changing portion is controlled by using at least information of the terahertz radiation that has interacted with the object and that is detected by the detector.

2. A distance adjusting apparatus according to claim 1, wherein the controlling portion controls the distance changing portion by using an amplitude or a phase of at least the terahertz radiation that has interacted with the object and that is detected by the detector.

3. A distance adjusting apparatus according to claim 1, further comprising:

a storing portion configured to store the information of the terahertz radiation detected by the detector under a condition in which no interaction occurs as reference information; and a judging portion to judge occurrence of the interaction at the time when the information of the terahertz radiation detected by the detector changes from the reference information.

4. A distance adjusting apparatus according to any one of claims 1 to 3, further comprising:
- a delay portion configured to change a timing at which the detector detects the terahertz radiation; and
- a processing portion configured to obtain information of a time waveform of the terahertz radiation from a plurality of intensity signals of the terahertz radiation detected by the detector, the plurality of intensity signals being obtained by using the delay portion and having different timings.

5. A distance adjusting apparatus according to claim 3,
- wherein the interaction is caused by leaking electromagnetic field of the terahertz radiation transmitted through the transmission line and the object, and
- wherein the distance adjusting apparatus further comprises an adjusting unit for adjusting an intensity of the leaking electromagnetic field by using a result of the judging portion.

6. A distance adjusting apparatus according to claim 1, wherein the transmission line comprises a distance adjustment transmission line for adjusting the distance and an examination transmission line for examining the object.

7. An examining apparatus for examining an object, comprising:
- the distance adjusting apparatus recited in claim 1; and
- an object holder for holding the object.

8. An examining apparatus for examining an object, comprising:
- the distance adjusting apparatus recited in claim 1; and
- an endoscope probe,
- wherein the distance adjusting apparatus is disposed on an end tip of the endoscope probe.

9. A distance adjusting apparatus according to claim 1, further comprising a sensor portion including the generator, the transmission line and the detector.

10. A distance adjusting method for adjusting a distance to an object by using terahertz radiation, said method comprising:
- a first step of generating terahertz radiation under a first condition in which a distance between an object and a transmission line for transmitting terahertz radiation is set at a first distance;
- a second step of detecting the terahertz radiation generated in the first step under the first condition;
- a third step of obtaining information of the terahertz radiation detected in the second step;
- a fourth step of moving the transmission line or the object to change the distance to a second distance shorter than the first distance;
- a fifth step of generating terahertz radiation under a second condition in which the distance is set at the second distance;
- a sixth step of detecting the terahertz radiation generated in the fifth step under the second condition;
- a seventh step of obtaining information of the terahertz radiation detected in the sixth step;
- an eighth step of comparing the information obtained in the third step to the information obtained in the seventh step;
- a ninth step of judging presence or absence of interaction between the object and leaking electromagnetic field of the terahertz radiation transmitted through the transmission line, based on presence or absence of a change in a result of the comparison of the information performed in the eighth step;
- a tenth step of increasing an intensity of the leaking electromagnetic field of the terahertz radiation transmitted through the transmission line; and
- an eleventh step of, after the tenth step, examining the object based on information of the terahertz radiation, after the distance is adjusted based on the information of the terahertz radiation, so that the leaking electromagnetic field of the terahertz radiation transmitted through the transmission line interacts with the object.

11. A distance adjusting method according to claim 10, wherein the information of the terahertz radiation is at least one of intensity, time waveform, amplitude, and phase of electromagnetic radiation, and a frequency spectrum obtained by means of a Fourier transform.

12. A distance adjusting method according to claim 10, further comprising a twelfth step of moving the transmission line or the object to decrease the distance to a third distance shorter than the second distance when the interaction is found to be absent in the ninth step.

13. A distance adjusting method according to claim 10, further comprising a thirteenth step of storing the information of the terahertz radiation obtained in the third step, and wherein the information of the terahertz radiation stored in the thirteenth step is used as reference information for comparison to information of terahertz radiation obtained under a condition of a distance different from the first distance.

14. A distance adjusting method according to claim 10, wherein the transmission line is brought close to the object in a coarse moving mode, and upon detection of a distance at which the interaction occurs, the transmission line is brought closer to the object in a fine moving mode.

15. A distance adjusting method according to claim 10, wherein, in the tenth step, the intensity of the leaking electromagnetic field is increased by at least one of a method of changing the transmission line for use from a first transmission line with weak leaking electromagnetic field to a second transmission line with leaking electromagnetic field stronger than the leaking electromagnetic field of the first transmission line, and a method of increasing an intensity of the generated terahertz radiation.

16. An examining method using a transmission line for transmitting terahertz radiation and for examining an object by using the terahertz radiation, said method comprising:
- a first detecting step of detecting the terahertz radiation transmitted through the transmission line with a first distance between the transmission line and the object;
- a changing step of changing the first distance to a second distance in a direction across a transmission direction of the terahertz radiation through the transmission line;
- a second detecting step of detecting the terahertz radiation transmitted through the transmission line in the second distance; and
- a determining step of determining a distance between the transmission line and the object by using the terahertz radiation detected in the first detecting step and the second detecting step,
- wherein the terahertz radiation transmitted through the transmission line and the object are interacted with each other in the determined distance to examine the object by using the interacted terahertz radiation.

17. An examining apparatus for examining an object comprising:
- a transmission line for transmitting terahertz radiation to interact with an object;
- a generator for generating the terahertz radiation transmitted through the transmission line;
- a detector for detecting the terahertz radiation transmitted through the transmission line;
- a distance changing portion configured to adjust a distance between the transmission line and an object in a direction across a transmission direction of the terahertz radiation through the transmission line; and a controlling portion configured to control the distance changing portion by using at least information of the terahertz radiation that has interacted with the object and that is detected by the detector, and a determining portion configured to determine a distance between the transmission line and the object by using the information of the interacted terahertz radiation, wherein the terahertz radiation and the object are caused to interact with each other when at the determined distance to examine the object by using the terahertz radiation that has interacted with the object.

* * * * *